(No Model.) 2 Sheets—Sheet 1.
L. T. STANLEY.
APPARATUS FOR ELECTRICALLY PURIFYING WATER.
No. 481,979. Patented Sept. 6, 1892.
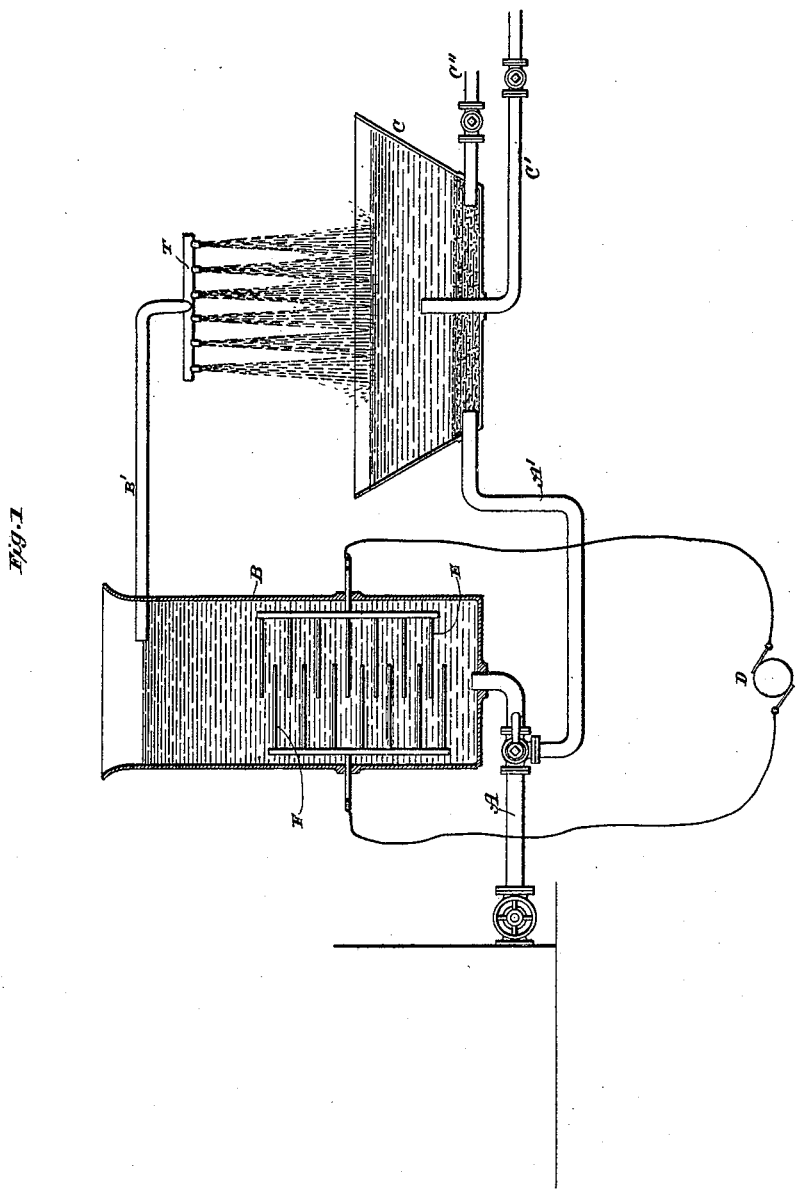

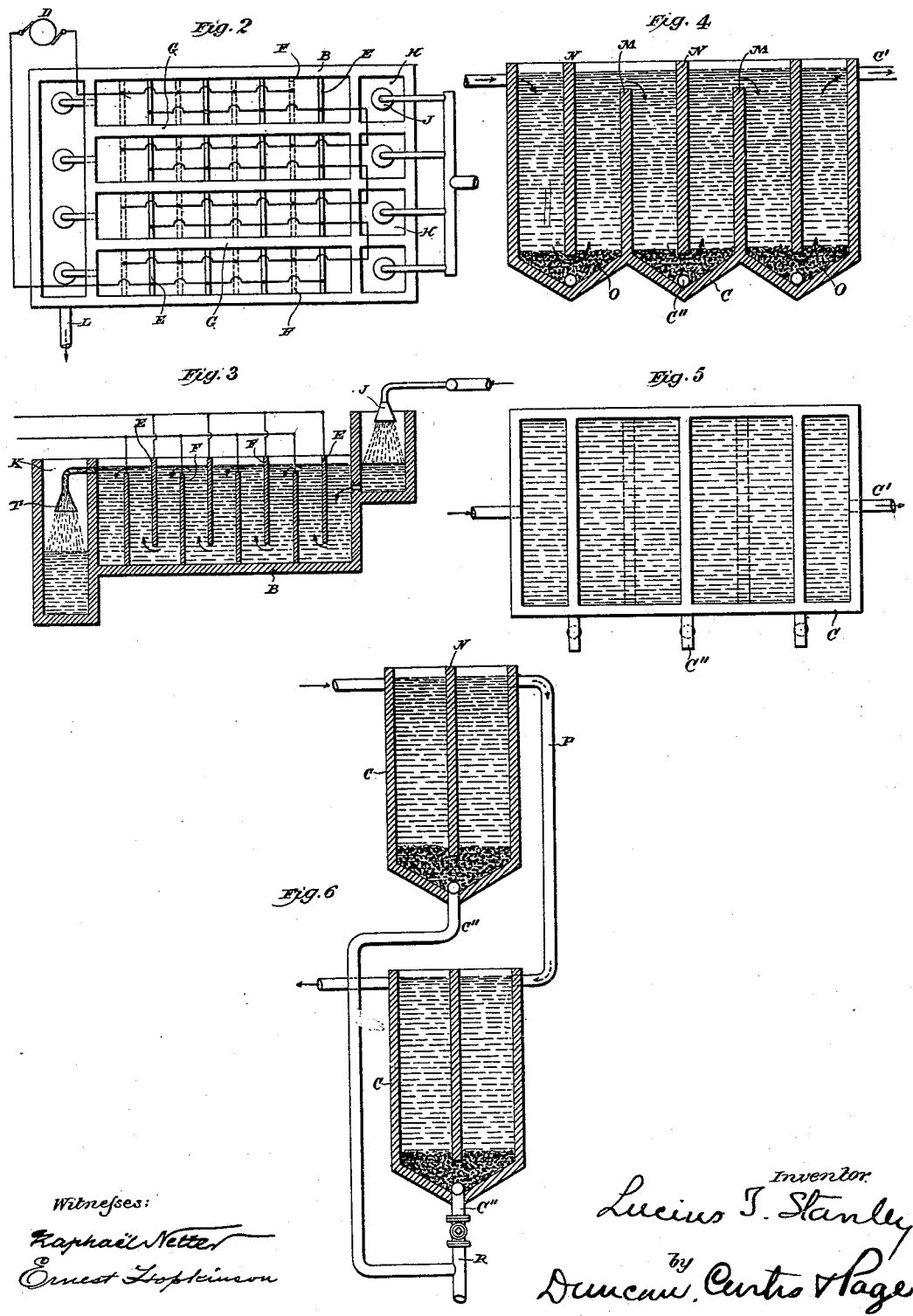

UNITED STATES PATENT OFFICE.

LUCIUS T. STANLEY, OF BROOKLYN, NEW YORK, ASSIGNOR, BY MESNE ASSIGNMENTS, TO THE CUTTER ELECTRICAL AND MANUFACTURING COMPANY, OF PHILADELPHIA, PENNSYLVANIA.

APPARATUS FOR ELECTRICALLY PURIFYING WATER.

SPECIFICATION forming part of Letters Patent No. 481,979, dated September 6, 1892.

Application filed February 11, 1890. Serial No. 339,982. (No model.)

*To all whom it may concern:*

Be it known that I, LUCIUS T. STANLEY, a citizen of the United States, residing at Brooklyn, in the county of Kings and State of New York, have invented certain new and useful Improvements in Apparatus for Electrically Purifying Water, of which the following is a specification, reference being had to the drawings accompanying and forming a part of the same.

This invention relates to apparatus for purifying water by electrical or electrolytic action for the purpose of eliminating therefrom animal matter, bacteria; and organic impurities of all kinds in order to render it pure and wholesome for drinking and other purposes.

This invention is an improvement in apparatus of the kind stated; and in order that the special features may be better understood the following description of the general character of such apparatus is given: Water to be purified is caused to pass slowly between the two electrodes, the positive of which is of iron, while the negative may be of any conducting substance, but preferably carbon, and the water itself is made to serve as the electrolyte. By the electrolytic action of a current passed between the electrodes through the water the constituent elements of the latter (oxygen and hydrogen) are dissociated, the former attacking the positive electrode, forming oxide of iron. This salt having a strong affinity for animal and organic matter combines with such impurities of this nature as the water may contain and renders them flocculent, and at the same time the hydrogen, which is developed in minute bubbles, attaches itself to the particles of flocculent matter, so that when they have passed from the electrodes into another chamber their buoyancy carries them up to the top of said chamber, where they are floated off into another chamber and allowed to settle.

In practice I have found that the union of the hydrogen with the gelatinous particles resulting from the combination of the oxide of iron and the organic impurities in the water is so intimate that it is frequently difficult to dispose of such impurities, either by overflow or by leaving them to settle, and this led me to investigations that resulted in the present discovery or invention, the general nature of which is as follows: I now cause the water to flow between electrodes of iron and (preferably) carbon, by which it is electrolyzed, the animal matter and similar impurities therein being rendered flocculent. After passing beyond the electrodes the impurities are carried along the water to the upper portion of the chamber and out through an outlet which is at or near the top of the same. The outlet-pipe is provided with a rose or perforated spraying-pipe, by which the water is divided up into fine streams or drops. From this spraying pipe or nozzle it falls through a determined space into a settling-vessel, from which it is drawn off as required. The effect or action of this seems to be twofold. The breaking up or spraying of the water and its descent through the air appears to more effectually release the hydrogen bubbles, while the aeration of the water in the descent seems to facilitate very greatly the subsequent settling of the impurities therein.

The specific devices by which the invention is or may be carried into effect are illustrated in the annexed drawings.

Figure 1 is a vertical sectional view of an apparatus illustrating the principle of the construction and mode of operation of the invention. The remaining figures illustrate the preferred apparatus which I employ in carrying out the invention, Fig. 2 being a plan view of the electrolyzing chamber or part of the apparatus; Fig. 3, a vertical cross-section of the same; Fig. 4, a vertical section of the settling tank or vessel; Fig. 5, a plan view of the same, and Fig. 6 a vertical section of a modified form of settling device.

Similar letters of reference indicate corresponding parts in the several figures.

In Fig. 1, A designates a main or pipe which conveys to the apparatus the water to be purified.

B is any suitable tank or receptacle, in the lower part of which are arranged a series of electrodes E and F, of iron and carbon, respectively. These electrodes are connected in the ordinary manner with a source of current D and are arranged in any desired manner, so that the water which is introduced at the bottom of the vessel B must pass up between them and be subjected to a sufficient electrolytic action to produce the desired effect.

Near the top of the vessel B is an outlet-pipe B', provided with a perforated pipe or nozzle T, through which the overflow from B passes and by which it is divided or sprayed.

Below the rose T is a vessel or tank C, in which the drops or streams of water are collected and allowed to settle. When this vessel is filled, the supply of water is shut off, and after a short time the sediment or sludge settles in the bottom of the vessel, leaving the upper part of the water clear and pure. The pure water is drawn off through a pipe C'.

An outlet C'', near the bottom of the tank C, is provided for drawing off the sediment or sludge, and an inlet A' from the main is also connected with the tank C near the bottom for flushing it out when necessary.

The apparatus shown in the other figures is more desirable for practical purposes. In said apparatus, B is the electrolyzing tank or portion. It is divided into longitudinal compartments by insulating-partitions G, with each of which a small receiving or supply chamber H communicates. A series of electrodes is arranged in each compartment. These are preferably arranged as shown— that is to say, the positive electrodes of iron E form water-tight partitions across the compartments, except that they do not extend entirely to the bottom of the tank, but extend up above the level of water when the compartments are full, while the negative electrodes F, of carbon, form similar divisions, except that they extend completely to the bottom but do not reach to the surface of the water. The water delivered into the compartment, therefore, is caused to flow alternately up and down between opposite electrodes, in which way it is thoroughly exposed to the action of the current or is electrolyzed. The several series of electrodes are preferably connected to the dynamo or other source of current D in multiple arc.

The water to be purified is delivered into the receiving or supply chambers H by jets or sprays through perforated nozzels J, by which means the electrolyzing part of the apparatus is more effectually insulated, while the water is areated and charged with oxygen, which facilitates the subsequent process or treatment. After passing between the electrodes the water is delivered through perforated nozzles into a tank or receiver K, provided with an outlet L, which leads to the settling tank or vessel C. This vessel is divided into compartments by partitions M, which extend from the bottom nearly to the level of the water, and a zigzag course for the water through these compartments is provided by partitions or aprons N, extending down nearly to the bottom of each compartment. The bottom of each compartment, furthermore, slopes from the sides to the center, as shown, and an outlet-pipe C'' is run from the lowest point of each compartment, by which the impurities and sludge are drawn off.

To make an even flow of water and to assist in checking the flow of the flocculent particles of animal matter coagulated by the electrolytic action, I place a quantity of gravel O in the bottom of each compartment. The purified water is drawn off by the outlet C'.

The compartments of the subsiding or settling tank may be independent of one another, if so desired, and may be arranged one above the other, as shown in Fig. 6. In such case the water after passing down and up through the first compartment is conducted by a pipe P to the next, and so on, while the outlets C'' connect with a pipe R.

What I claim is—

1. In an apparatus for purifying water, the combination, with a series of electrodes between which the water passes, of a settling-chamber into which the water is delivered and means, substantially as described, for dividing up or spraying the water in its passage from the electrodes to the settling-chamber, as set forth.

2. The combination, with an electrolyzing-chamber and a series of electrodes alternately opposite and forming a zigzag course of vertical passage between them for water, of a settling-chamber into which the water is delivered and means for dividing up or spraying the water in its passage from the electrolyzing to the settling chamber, as set forth.

3. The combination, with an electrolyzing-chamber, electrodes contained therein, and a water-supply connected with said chamber, of an outlet-pipe in position to take off the water after its passage between the electrodes and provided with a rose or perforated nozzle and a settling-chamber into which the water is delivered in jets or spray, as set forth.

4. The combination, with one or more electrolyzing chambers or compartments and a series of iron and carbon electrodes contained in each, of means for delivering water to the chamber or chambers in jets or spray, a settling-chamber, and means for dividing up or spraying the water in its passage from the electrolyzing-chamber to the same, as set forth.

5. The combination, with the electrolyzing chamber or chambers and an outlet provided with a rose or spraying-pipe, of a settling-chamber composed of one or more connected compartments with sloping or tapered bottoms and partitions or aprons extending from the top nearly to the bottom of each compartment, as set forth.

LUCIUS T. STANLEY.

Witnesses:
 ERNEST HOWARD HUNTER,
 S. T. YERKES.